United States Patent
Nakamura

(10) Patent No.: US 12,344,742 B2
(45) Date of Patent: *Jul. 1, 2025

(54) TREAD RUBBER COMPOSITION AND PNEUMATIC TIRE

(71) Applicant: Sumitomo Rubber Industries, Ltd., Hyogo (JP)

(72) Inventor: Kentaro Nakamura, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,071

(22) Filed: Mar. 25, 2024

(65) Prior Publication Data

US 2024/0228754 A1  Jul. 11, 2024

Related U.S. Application Data

(62) Division of application No. 17/273,128, filed as application No. PCT/JP2019/029413 on Jul. 26, 2019, now Pat. No. 11,993,709.

(30) Foreign Application Priority Data

Sep. 20, 2018  (JP) ................................. 2018-176161

(51) Int. Cl.
  *C08L 7/00*  (2006.01)
  *B60C 1/00*  (2006.01)

(52) U.S. Cl.
  CPC .............. *C08L 7/00* (2013.01); *B60C 1/0016* (2013.01); *C08L 2205/025* (2013.01); *C08L 2205/035* (2013.01); *C08L 2312/00* (2013.01)

(58) Field of Classification Search
  CPC ........ C08L 7/00; C08L 2205/025; C08L 9/06; C08L 9/00; C08L 25/16; C08L 91/06
  See application file for complete search history.

(56) References Cited

U.S. PATENT DOCUMENTS

| | | | |
|---|---|---|---|
| 11,993,709 B2 * | 5/2024 | Nakamura | ................ C08L 7/00 |
| 2008/0033103 A1 | 2/2008 | Kameda et al. | |
| 2008/0149245 A1 | 6/2008 | Thielen et al. | |
| 2012/0053263 A1 | 3/2012 | Miyazaki | |
| 2012/0083559 A1 * | 4/2012 | Costantini | ............... C08L 21/00 524/122 |
| 2012/0259038 A1 | 10/2012 | Kojima | |
| 2015/0375566 A1 * | 12/2015 | Akahori | ................. C08K 5/548 524/493 |
| 2020/0131342 A1 | 4/2020 | Thomasson et al. | |

FOREIGN PATENT DOCUMENTS

| | | |
|---|---|---|
| CN | 101014660 A | 8/2007 |
| JP | H11-49891 A | 2/1999 |
| JP | 2000-313768 A | 11/2000 |
| JP | 2006-056979 A | 3/2006 |
| JP | 2006-257164 A | 9/2006 |
| JP | 2009-084485 A | 4/2009 |
| JP | 2010-248444 A | 11/2010 |
| JP | 2011-132305 A | 7/2011 |
| JP | 2011-225680 A | 11/2011 |
| JP | 2012-046602 A | 3/2012 |
| JP | 2012-219124 A | 11/2012 |
| JP | 2013-001805 A | 1/2013 |
| JP | 2015-013923 A | 1/2015 |
| KR | 10-2005-0064426 A | 6/2005 |
| WO | 2018/105230 A1 | 6/2018 |

OTHER PUBLICATIONS

International Search Report issued in PCT/JP2019/029413; mailed Sep. 10, 2019.

* cited by examiner

*Primary Examiner* — Mark S Kaucher
(74) *Attorney, Agent, or Firm* — Studebaker Brackett PLLC

(57) ABSTRACT

Provided are tread rubber compositions and pneumatic tires which are excellent in abrasion resistance. Included is a tread rubber composition containing, based on 100% by mass of a rubber component therein, 10% by mass or more of styrene-butadiene rubber and 10% by mass or more of polybutadiene rubber, and having an absolute value of change in hardness before and after heat aging, $|\Delta Hs|$, satisfying the following relationship (1) and an absolute value of change in Swell before and after heat aging, $|\Delta Swell|$, satisfying the following relationship (2):

$|\Delta Hs| \leq 3.0$   (1);

$|\Delta Swell| \leq 20\%$   (2).

11 Claims, No Drawings

TREAD RUBBER COMPOSITION AND PNEUMATIC TIRE

CROSS-REFERENCE TO RELATED APPLICATIONS

This application is a Divisional of U.S. patent application Ser. No. 17/273,128 filed Mar. 3, 2021, which is the U.S. National Stage of International Application No. PCT/JP2019/029413 filed Jul. 26, 2019, which claims benefit of priority to Japanese Patent Application No. 2018-176161 filed Sep. 20, 2018, the entire contents of which are incorporated herein by reference.

TECHNICAL FIELD

The present invention relates to tread rubber compositions and pneumatic tires.

BACKGROUND ART

In general, the physical properties of tires will change from when they are new due to aging. One of the major causes of this phenomenon is aging by heat during use. For example, techniques that have been proposed for reducing the differences in physical properties between new and aged tires include increasing the amount of mono-sulfur crosslinks to reduce the amount of —S—S— bonds (poly-sulfur crosslinks) which may be easily broken by heat.

Moreover, Patent Literature 1 discloses a rubber composition that contains an isoprene-based rubber, polybutadiene rubber, silica, aromatic oil, specific compound, and other ingredients to improve properties such as heat resistance. However, due to the increasing demand for performance improvement, it is desirable to further improve properties such as abrasion resistance.

CITATION LIST

Patent Literature

Patent Literature 1: JP 2012-219124 A

SUMMARY OF INVENTION

Technical Problem

The present invention aims to solve the above problem and provide tread rubber compositions and pneumatic tires which are excellent in abrasion resistance.

Solution to Problem

The present invention relates to a tread rubber composition,
  containing, based on 100% by mass of a rubber component therein, 10% by mass or more of styrene-butadiene rubber and 10% by mass or more of polybutadiene rubber, and
  having an absolute value of change in hardness before and after heat aging, $|\Delta Hs|$, satisfying the following relationship (1) and an absolute value of change in Swell before and after heat aging, $|\Delta Swell|$, satisfying the following relationship (2):

$$|\Delta Hs| \leq 3.0 \quad (1);$$

$$|\Delta Swell| \leq 20\% \quad (2).$$

The rubber composition preferably contains sulfur and a crosslinking agent other than sulfur.

The rubber composition preferably contains a crosslinking agent other than sulfur alone as a crosslinking agent.

The rubber composition preferably contains 25% by mass or more of an isoprene-based rubber based on 100% by mass of the rubber component.

The present invention also relates to a pneumatic tire, including a tread including the rubber composition.

Advantageous Effects of Invention

The tread rubber compositions of the present invention contain, based on 100% by mass of the rubber component therein, 10% by mass or more of styrene-butadiene rubber and 10% by mass or more of polybutadiene rubber, and further have an absolute value of change in hardness before and after heat aging, $|\Delta Hs|$, satisfying relationship (1) and an absolute value of change in Swell before and after heat aging, $|\Delta Swell|$, satisfying relationship (2). Such rubber compositions have the properties required of tire tread rubbers, such as grip performance, and provide significantly improved abrasion resistance.

DESCRIPTION OF EMBODIMENTS

The tread rubber compositions of the present invention contain, based on 100% by mass of the rubber component therein, 10% by mass or more of styrene-butadiene rubber and 10% by mass or more of polybutadiene rubber, and further have an absolute value of change in hardness before and after heat aging, $|\Delta Hs|$, and an absolute value of change in Swell before and after heat aging, $|\Delta Swell|$, which satisfy relationships (1) and (2), respectively.

Thus, the tread rubber compositions not only have the required properties such as grip performance, but also provide excellent abrasion resistance.

The reason for these advantageous effects is not clear, but may be explained as follows.

Since heat aging (heat degradation) is considered to greatly affect the hardness and degree of crosslinking of rubber among other physical properties, the inventor first expected that the changes in hardness and degree of crosslinking could be reduced by using a material that forms a bond stronger than an —S—S— bond in polymer crosslinking. This led to the finding that the differences in properties between new and aged tires may be reduced by adjusting a rubber compound containing predetermined amounts of styrene-butadiene rubber (SBR) and polybutadiene rubber (BR) to have an absolute value of change in hardness before and after heat aging, $|\Delta Hs|$, satisfying relationship (1) and an absolute value of change in Swell before and after heat aging, $|\Delta Swell|$, satisfying relationship (2), with the Hs denoting the hardness of the rubber compound and the Swell indicating the degree of crosslinking. Thus, it is believed that the rubber composition containing predetermined amounts of SBR and BR and satisfying relationships (1) and (2) may provide excellent abrasion resistance for a long period of time.

Then, the inventor expected that, because crosslinking with sulfur alone limits the reduction of heat aging, heat aging may be reduced by techniques such as combining sulfur with another crosslinking agent or using a sulfur-free crosslinking agent. For example, when 1,6-bis(N,N'-dibenzylthiocarbamoyldithio)hexane is used as a crosslinking agent, it is believed that this compound may form an —S—$(CH_2)_6$—S— bond between the polymer molecules and have a significant effect in reducing heat aging because the S—C bond has a higher activation energy and is less breakable than the —S—S— bond formed by sulfur. Moreover, when dicumyl peroxide, for example, is used as a sulfur-free crosslinking agent, it is believed that the crosslinking agent (dicumyl peroxide) will not be placed between the polymer molecules, and the polymer molecules by themselves may form a strong C—C bond between them, thus providing a strong effect in reducing heat aging. Therefore, it is believed that these crosslinking agents, for example, may be used to provide rubber compositions satisfying relationships (1) and (2) and therefore to provide excellent abrasion resistance.

Accordingly, the present invention solves the problem (purpose) consisting in improving abrasion resistance by a tread rubber composition having a structure that contains predetermined amounts of styrene-butadiene rubber and polybutadiene rubber and satisfies relationships (1) and (2). In other words, the parameters of relationships (1) and (2) do not define the problem (purpose), and the problem herein is to improve abrasion resistance. In order to provide a solution to this problem, a structure satisfying the parameters has been devised.

Examples of techniques for satisfying relationships (1) and (2) or the relationships (1-1) and (2-1) described later include: (a) a method of using a crosslinking agent (e.g., 1,6-bis(N,N'-dibenzylthiocarbamoyldithio)hexane) capable of forming a bond including an S—C bond between polymer molecules, (b) a method of using a crosslinking agent (e.g., organic peroxides) capable of causing polymer molecules by themselves to form a C—C bond between them, (c) a method of combining the method (a) and/or (b) and optionally the use of sulfur, (d) a method of incorporating finely divided carbon black, (e) a method of controlling the amounts of the foregoing ingredients, (f) a method of controlling the amounts of SBR and BR, and (g) a method of using a zinc dithiophosphate compound, which methods may be used either individually or in appropriate combination.

From the standpoint of abrasion resistance, the rubber compositions (vulcanized rubber compositions) have an absolute value of change in hardness before and after heat aging, |ΔHs| (|(Hs of rubber composition after heat aging)−(Hs of rubber composition before heat aging)|), satisfying the following relationship (1):

$$|\Delta Hs| \leq 3.0 \qquad (1).$$

The relationship (1) is preferably |ΔHs|≤2.5, more preferably |ΔHs|≤2.0, still more preferably |ΔHs|≤1.5, particularly preferably |ΔHs|≤1.0, most preferably |ΔHs|≤0.5. When the |ΔHs| satisfies the range indicated above, the change in hardness Hs before and after heat aging is small, and therefore excellent abrasion resistance tends to be obtained for a long period of time.

From the standpoints of abrasion resistance and practical use as tread rubbers, the rubber compositions, both before and after heat aging, preferably have a hardness (Hs) that satisfies the following relationship (1-1):

$$40 \leq Hs \leq 80 \qquad (1-1).$$

The relationship (1-1) is preferably 50≤Hs≤75, more preferably 55≤Hs≤70, still more preferably 60≤Hs≤68. When the Hs satisfies the range indicated above, excellent practical use as tread rubbers and abrasion resistance tend to be obtained. Moreover, the lower or upper limit of the Hs may be 50.0, 55.0, 60.0, 64.0, 64.5, 65.0, 65.5, 66.0, 66.5, 67.0, 67.5, 68.0, 68.5, 69.0, 69.5, 70.0, 71.0, 72.0, 73.0, 74.0, 75.0, or 76.0.

From the standpoint of abrasion resistance, the rubber compositions (vulcanized rubber compositions) have an absolute value of change in Swell before and after heat aging, |ΔSwell| (|(Swell of rubber composition after heat aging)−(Swell of rubber composition before heat aging)|), satisfying the following relationship (2):

$$|\Delta Swell| \leq 20\% \qquad (2).$$

The relationship (2) is preferably |ΔSwell|≤15%, more preferably |ΔSwell|≤10%, still more preferably |ΔSwell|≤5%. When the |ΔSwell| satisfies the range indicated above, the change in degree of crosslinking (Swell) before and after heat aging is small, and therefore excellent abrasion resistance tends to be obtained for a long period of time. Moreover, the |ΔSwell| may be 19% or less, 18% or less, 17% or less, 16% or less, 14% or less, 13% or less, 11% or less, 8% or less, or 4% or less.

From the standpoint of abrasion resistance, the rubber compositions, both before and after heat aging, preferably have a Swell that satisfies the following relationship (2-1):

$$150\% \leq Swell \leq 450\% \qquad (2-1).$$

The relationship (2-1) is preferably 200%≤Swell≤400%, more preferably 230% Swell 350%, still more preferably 250%≤Swell≤300%. When the Swell satisfies the range indicated above, excellent abrasion resistance tends to be obtained. Moreover, the lower or upper limit of the Swell may be 245, 262, 264, 268, 271, 279, 280, 283, 286, 288, 292, 296, 302, 304, 310, 311, 312, 316, 319, 320, 322, 327, 331, 335, 336, 339, or 341.

The heat aging is performed in accordance with JIS K6257:2010 under heat aging conditions (100° C., 96 hours). The hardness (Hs) of the rubbers may be measured using a type A durometer in accordance with JIS K6253 "Rubber, vulcanized or thermoplastic-Determination of hardness". The "ΔHs" denotes the change in Hs before and after heat aging. The "Swell" refers to the volume change (%) of a specimen (vulcanized rubber composition) before and after immersion in toluene. The "ΔSwell" denotes the change (%) in Swell before and after heat aging.

The rubber component of the rubber compositions includes styrene-butadiene rubber (SBR).

From the standpoints of abrasion resistance and practical use in tread applications (e.g., grip performance), the amount of the SBR based on 100% by mass of the rubber component in the rubber compositions is 10% by mass or more, preferably 15% by mass or more, more preferably 18% by mass or more. The upper limit is not limited, but is preferably 60% by mass or less, more preferably 40% by mass or less, still more preferably 30% by mass or less. Moreover, the lower or upper limit of the amount of the SBR may be 20% by mass or 25% by mass.

The SBR preferably has a styrene content of 5% by mass or higher, more preferably 10% by mass or higher, still more preferably 15% by mass or higher. The styrene content is also preferably 60% by mass or lower, more preferably 40% by mass or lower, still more preferably 25% by mass or lower. When the styrene content is within the range indicated above, good abrasion resistance tends to be obtained. Moreover, the lower or upper limit of the styrene content may be 23.5% by mass.

The styrene content is determined by $^1$H-NMR analysis.

The SBR may be any rubber having styrene and butadiene units. Examples include emulsion-polymerized styrene-butadiene rubber (E-SBR) and solution-polymerized styrene-butadiene rubber (S-SBR). The combined amount of the styrene and butadiene units based on 100% by mass of the SBR rubber is, for example, 95% by mass or more and may be 98% by mass or more or 100% by mass. These rubbers may be used alone or in combinations of two or more.

The SBR may be either unmodified or modified SBR. The modified SBR may be any SBR having a functional group interactive with a filler such as silica. For example, it may be a chain end-modified SBR obtained by modifying at least one chain end of SBR with a compound (modifier) having the functional group (chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group and at least one chain end is modified with the modifier); or a chain end-modified SBR that has been modified (coupled) with a polyfunctional compound having two or more epoxy groups in the molecule so that a hydroxy or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may be substituted. Preferred among these are amino groups (preferably amino groups whose hydrogen atom is replaced with a C1-C6 alkyl group), alkoxy groups (preferably C1-C6 alkoxy groups), alkoxysilyl groups (preferably C1-C6 alkoxysilyl groups), and amide groups.

Examples of the modifier for the modified SBR include: polyglycidyl ethers of polyols such as ethylene glycol diglycidyl ether, glycerol triglycidyl ether, trimethylolethane triglycidyl ether, and trimethylolpropane triglycidyl ether; polyglycidyl ethers of aromatic compounds having two or more phenol groups such as diglycidylated bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyl-diphenylmethylamine and 4,4'-diglycidyl-dibenzylmethylamine; diglycidylamino compounds such as diglycidylaniline, N,N'-diglycidyl-4-glycidyloxyaniline, diglycidylorthotoluidine, tetraglycidyl meta-xylenediamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis(1-methylpropyl)carbamic chloride, 4-morpholinecarbonyl chloride, 1-pyrrolidinecarbonyl chloride, N,N-dimethylcarbamic acid chloride, and N,N-diethylcarbamic acid chloride; epoxy group-containing silane compounds such as 1,3-bis(glycidyloxypropyl)tetramethyldisiloxane and (3-glycidyloxypropyl)pentamethyldisiloxane;

sulfide group-containing silane compounds such as (trimethylsilyl) [3-(trimethoxysilyl)propyl]sulfide, (trimethylsilyl) [3-(triethoxysilyl)propyl]sulfide, (trimethylsilyl) [3-(tripropoxysilyl)propyl]sulfide, (trimethylsilyl) [3-(tributoxysilyl)propyl]sulfide, (trimethylsilyl) [3-(methyldimethoxysilyl)propyl]sulfide, (trimethylsilyl) [3-(methyldiethoxysilyl)propyl]sulfide, (trimethylsilyl) [3-(methyldipropoxysilyl)propyl]sulfide, and (trimethylsilyl) [3-(methyldibutoxysilyl)propyl]sulfide;

N-substituted aziridine compounds such as ethyleneimine and propyleneimine; alkoxysilanes such as methyltriethoxysilane, N,N-bis(trimethylsilyl)-3-aminopropyltrimethoxysilane, N,N-bis(trimethylsilyl)-3-aminopropyltriethoxysilane, N,N-bis(trimethylsilyl)aminoethyltrimethoxysilane, and N,N-bis(trimethylsilyl)aminoethyltriethoxysilane; (thio)benzophenone compounds containing amino and/or substituted amino groups such as 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, 4,4'-bis(diphenylamino)benzophenone, and N,N,N',N'-bis(tetraethylamino)benzophenone; benzaldehyde compounds containing amino and/or substituted amino groups such as 4-N,N-dimethylaminobenzaldehyde, 4-N,N-diphenylaminobenzaldehyde, and 4-N,N-divinylaminobenzaldehyde; N-substituted pyrrolidones such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone; N-substituted piperidones such as N-methyl-2-piperidone, N-vinyl-2-piperidone, and N-phenyl-2-piperidone; and N-substituted lactams such as N-methyl-ε-caprolactam, N-phenyl-ε-caprolactam, N-methyl-ω-laurilolactam, N-vinyl-ω-laurilolactam, N-methyl-β-propiolactam, and N-phenyl-β-propiolactam; as well as N,N-bis(2,3-epoxypropoxy)-aniline, 4,4-methylene-bis (N,N-glycidylaniline), tris(2,3-epoxypropyl)-1,3,5-triazine-2,4,6-triones, N,N-diethylacetamide, N-methylmaleimide, N,N-diethylurea, 1,3-dimethylethyleneurea, 1,3-divinylethyleneurea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis(diphenylamino)-2-propanone, and 1,7-bis(methylethylamino)-4-heptanone.

The modification with any of the foregoing compounds (modifiers) can be performed by known methods.

SBR products manufactured or sold by ZS Elastomers Co., Ltd., JSR Corporation, Asahi Kasei Corporation, Zeon Corporation, etc. may be used as the SBR.

The rubber component of the rubber compositions includes polybutadiene rubber (BR).

From the standpoint of abrasion resistance, the amount of the BR based on 100% by mass of the rubber component in the rubber compositions is 10% by mass or more, preferably 15% by mass or more, more preferably 18% by mass or more. The upper limit is not limited, but is preferably 60% by mass or less, more preferably 40% by mass or less, still more preferably 30% by mass or less. Moreover, the lower or upper limit of the amount of the BR may be 20% by mass or 25% by mass.

The BR preferably has a cis content of 90% by mass or higher, more preferably 95% by mass or higher, still more preferably 98% by mass or higher. The upper limit is not limited. When the cis content is within the range indicated above, the advantageous effects tend to be better achieved.

The cis content of the BR may be measured by infrared absorption spectrometry.

The BR may be any polymer mainly having butadiene units. Examples include BR having high cis content, BR having low cis content, and BR containing syndiotactic polybutadiene crystals. These may be used alone or in combinations of two or more. The amount of the butadiene units based on 100% by mass of the BR rubber is, for example, 95% by mass or more and may be 98% by mass or more or 100% by mass. Rubbers having butadiene and styrene units do not correspond to BR but to SBR.

The BR may be either unmodified or modified BR. Examples of the modified BR include those into which the above-listed functional groups have been introduced. Commercial products available from Ube Industries, Ltd., JSR Corporation, Asahi Kasei Corporation, Zeon Corporation, etc. may be used.

The rubber component of the rubber compositions preferably includes an isoprene-based rubber.

The amount of the isoprene-based rubber based on 100% by mass of the rubber component in the rubber compositions is preferably 25% by mass or more, more preferably 40% by mass or more, still more preferably 50% by mass or more. Moreover, the upper limit is preferably 90% by mass or less, more preferably 80% by mass or less, still more preferably 70% by mass or less. When the amount is within the range indicated above, good abrasion resistance tends to be obtained. Moreover, the lower or upper limit of the amount of the isoprene-based rubber may be 50% by mass or 60% by mass.

The isoprene-based rubber may be any polymer mainly having isoprene units. Examples include polyisoprene rubber (IR), epoxidized polyisoprene rubber, hydrogenated polyisoprene rubber, grafted polyisoprene rubber, natural rubber (NR), deproteinized natural rubber (DPNR), highly purified natural rubber (UPNR), epoxidized natural rubber (ENR), hydrogenated natural rubber (HNR), and grafted natural rubber. These may be used alone or in combinations of two or more. The amount of the isoprene units based on 100% by mass of the isoprene-based rubber is, for example, 95% by mass or more and may be 98% by mass or more or 100% by mass.

The rubber component of the rubber compositions may include additional rubber materials other than SBR, BR, and isoprene-based rubbers. Examples of such additional rubber materials include chloroprene rubber (CR) and acrylonitrile-butadiene rubber (NBR). These may be used alone or in combinations of two or more.

From the standpoint of abrasion resistance, the rubber compositions preferably contain finely divided carbon black.

The nitrogen adsorption specific surface area ($N_2SA$) of the finely divided carbon black is preferably 120 $m^2/g$ or more, more preferably 150 $m^2/g$ or more, still more preferably 160 $m^2/g$ or more. When the $N_2SA$ is not less than the lower limit, the finely divided carbon black tends to provide a sufficient reinforcing effect, resulting in good abrasion resistance. The $N_2SA$ of the finely divided carbon black is preferably 300 $m^2/g$ or less, more preferably 250 $m^2/g$ or less, still more preferably 200 $m^2/g$ or less. When the $N_2SA$ is not more than the upper limit, dispersibility tends to be ensured for the carbon black. Moreover, the lower or upper limit of the $N_2SA$ of the finely divided carbon black may be 181 $m^2/g$.

The $N_2SA$ of the finely divided carbon black may be determined in accordance with JIS K 6217-2:2001.

The amount of the finely divided carbon black per 100 parts by mass of the rubber component is preferably 5 parts by mass or more, more preferably 20 parts by mass or more, still more preferably 35 parts by mass or more, particularly preferably 40 parts by mass or more. When the amount is not less than the lower limit, good abrasion resistance tends to be obtained. The amount of the finely divided carbon black is preferably 100 parts by mass or less, more preferably 80 parts by mass or less, still more preferably 60 parts by mass or less. When the amount is not more than the upper limit, dispersibility tends to be ensured for the carbon black. Moreover, the lower or upper limit of the amount of the finely divided carbon black may be 45 parts by mass.

The finely divided carbon black may be prepared as described in JP 2000-319539 A or JP H8-507555 T, for example.

The finely divided carbon black may be commercially available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The rubber compositions preferably contain silica. The use of silica allows the rubber compositions to achieve both grip performance and fuel economy.

The amount of the silica per 100 parts by mass of the rubber component is preferably 5 parts by mass or more, more preferably 10 parts by mass or more, still more preferably 15 parts by mass or more. The upper limit is preferably 80 parts by mass or less, more preferably 60 parts by mass or less, still more preferably 40 parts by mass or less. When the amount is within the range indicated above, both grip performance and fuel economy tend to be achieved. Moreover, the lower or upper limit of the amount of the silica may be 20 parts by mass or 40 parts by mass.

The silica preferably has a nitrogen adsorption specific surface area ($N_2SA$) of 40 $m^2/g$ or more, more preferably 80 $m^2/g$ or more, still more preferably 100 $m^2/g$ or more. The $N_2SA$ is preferably 300 $m^2/g$ or less, more preferably 200 $m^2/g$ or less, still more preferably 180 $m^2/g$ or less. When the $N_2SA$ is within the range indicated above, good abrasion resistance tends to be obtained. Moreover, the lower or upper limit of the $N_2SA$ of the silica may be 175 $m^2/g$.

The nitrogen adsorption specific surface area of the silica is determined by the BET method in accordance with ASTM D3037-81.

Examples of the silica include dry silica (anhydrous silica) and wet silica (hydrous silica). Wet silica is preferred because it has a large number of silanol groups. For example, commercial products available from Degussa, Rhodia, Tosoh silica Corporation, Solvay Japan, Tokuyama Corporation, etc. may be used.

The rubber compositions may contain an additional filler (reinforcing filler) other than carbon black and silica. Non-limiting examples of the additional filler include calcium carbonate, talc, alumina, clay, aluminum hydroxide, aluminum oxide, and mica.

The amount of the fillers per 100 parts by mass of the rubber component is preferably 20 parts by mass or more, more preferably 40 parts by mass or more, still more preferably 55 parts by mass or more, particularly preferably 65 parts by mass or more. When the amount is not less than the lower limit, improved abrasion resistance tends to be provided. The amount of the fillers is also preferably 150 parts by mass or less, more preferably 100 parts by mass or less, still more preferably 80 parts by mass or less. When the amount is not more than the upper limit, good properties such as processability tend to be obtained. Moreover, the lower or upper limit of the amount of the fillers may be 85 parts by mass.

The rubber compositions containing silica preferably further contain a silane coupling agent. This tends to provide good properties such as strength.

The amount of the silane coupling agent per 100 parts by mass of the silica is preferably 0.1 parts by mass or more, more preferably 2 parts by mass or more, still more preferably 3 parts by mass or more. The amount is also preferably 20 parts by mass or less, more preferably 16 parts by mass or less, still more preferably 12 parts by mass or less. When the amount is within the range indicated above, good grip performance tends to be obtained.

Any silane coupling agent may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more. Among these, sulfide or mercapto silane coupling agents are preferred in order to well achieve the advantageous effects.

The rubber compositions preferably contain an organic resin. The incorporation of an organic resin tends to provide good grip performance.

In the rubber compositions containing an organic resin(s), the amount (total amount) of the organic resin(s) per 100 parts by mass of the rubber component is preferably 0.5 parts by mass or more, more preferably 1.5 parts by mass or more. The amount is also preferably 5.0 parts by mass or less, more preferably 3.5 parts by mass or less. When the amount is within the range indicated above, good grip performance tends to be obtained.

Examples of suitable organic resins include copolymers of aromatic hydrocarbons with aliphatic hydrocarbons.

The copolymers are polymers (resins) containing an aromatic hydrocarbon such as styrene and an aliphatic hydrocarbon such as ethylene or propylene as structural monomers, and may be commercially available from STRUKTOL, Performance Additive, etc. These may be used alone or in combinations of two or more. Preferred among these are resins containing ethylene, propylene, and styrene as structural monomers (ethylene-propylene-styrene copolymers).

The softening point of the copolymers is preferably 20° C. or higher, more preferably 40° C. or higher, still more preferably 60° C. or higher, but is preferably 140° C. or lower, more preferably 100° C. or lower.

When the copolymers are ethylene-propylene-styrene copolymers, the amount of the ethylene-propylene portion (EP content) based on 100% by mass of the ethylene-propylene-styrene copolymers is preferably 70% by mass or more, more preferably 80% by mass or more, but is preferably 98% by mass or less, more preferably 95% by mass or less.

From the standpoint of achieving both abrasion resistance and processability, the rubber compositions preferably contain a softener. The term "softener" refers to a component that is liquid at room temperature (25° C.) and has a softening effect. Any softener may be used, and examples include oils and liquid polymers (liquid diene polymers). These may be used alone or in combinations of two or more.

The amount (total amount) of the softener(s) per 100 parts by mass of the rubber component is preferably 2 parts by mass or more, more preferably 4 parts by mass or more. The amount is also preferably 20 parts by mass or less, more preferably 10 parts by mass or less, still more preferably 7 parts by mass or less. When the amount is within the range indicated above, good properties such as abrasion resistance tend to be obtained. Herein, the amount of the softener(s) includes the amount of the oils contained in the oil extended rubbers, if used.

Non-limiting examples of the oils include conventional oils, including, for example, process oils such as paraffinic process oils, aromatic process oils, and naphthenic process oils, low PCA (polycyclic aromatic) process oils such as TDAE and MES, vegetable oils, and mixtures thereof. Among these, aromatic process oils are preferred in terms of rubber physical properties.

For example, commercial products available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc. may be used. These may be used alone or in combinations of two or more.

From the standpoint of properties such as processability, the amount of the oils per 100 parts by mass of the rubber component is preferably 2 parts by mass or more, more preferably 4 parts by mass or more. The amount is also preferably 20 parts by mass or less, more preferably 10 parts by mass or less, still more preferably 7 parts by mass or less. When the amount is within the range indicated above, both good abrasion resistance and processability tend to be obtained. Herein, the amount of the oils includes the amount of the oils contained in the oil extended rubbers, if used.

The term "liquid polymer" refers to a polymer that is liquid at room temperature (25° C.). Examples include liquid diene polymers.

The liquid diene polymers preferably have a polystyrene equivalent weight average molecular weight (Mw) of $1.0 \times 10^3$ to $2.0 \times 10^5$, more preferably $3.0 \times 10^3$ to $1.5 \times 10^4$, as measured by gel permeation chromatography (GPC).

Herein, the Mw of the liquid diene polymers is measured by gel permeation chromatography (GPC) and calibrated with polystyrene standards.

Examples of the liquid diene polymers include liquid styrene-butadiene copolymers (liquid SBR), liquid polybutadiene polymers (liquid BR), liquid polyisoprene polymers (liquid IR), and liquid styrene-isoprene copolymers (liquid SIR).

The amount of the liquid polymers (liquid diene polymers) per 100 parts by mass of the rubber component is preferably 1 part by mass or more, more preferably 3 parts by mass or more, still more preferably 4 parts by mass or more. The amount is also preferably 40 parts by mass or less, more preferably 35 parts by mass or less, still more preferably 30 parts by mass or less, particularly preferably 27 parts by mass or less.

The rubber compositions (vulcanized rubber compositions) preferably contain a crosslinking agent.

Examples of the crosslinking agent include sulfur (sulfur vulcanizing agent) and crosslinking agents other than sulfur (e.g., crosslinking agents capable of forming a bond including an S—C bond between polymer molecules, crosslinking agents capable of causing polymer molecules by themselves to form a C—C bond between them, and zinc dithiophosphates). In particular, the crosslinking agent is preferably a combination of sulfur and a crosslinking agent other than sulfur or a crosslinking agent other than sulfur alone, particularly preferably a combination of sulfur and a crosslinking agent capable of forming a bond including an S—C bond between polymer molecules, or a crosslinking agent capable of causing polymer molecules by themselves to form a C—C bond between them alone, or a combination of sulfur and a zinc dithiophosphate.

Examples of the sulfur include those commonly used in the rubber industry, such as powdered sulfur, precipitated sulfur, colloidal sulfur, insoluble sulfur, highly dispersible sulfur, and soluble sulfur. Commercial products available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc. may be used. These may be used alone or in combinations of two or more.

The amount of the sulfur (sulfur vulcanizing agent) per 100 parts by mass of the rubber component is preferably 0.1 parts by mass or more, more preferably 0.3 parts by mass or more. The upper limit is preferably 2.0 parts by mass or less, more preferably 1.5 parts by mass or less, still more preferably 1.0 part by mass or less. When the amount is within the range indicated above, good abrasion resistance tends to be obtained. Moreover, the lower or upper limit of the amount of the sulfur may be 0.5 parts by mass.

Suitable examples of the crosslinking agents capable of forming a bond including an S—C bond between polymer molecules include compounds represented by the following formula (I). The compounds can allow the rubber compositions to possess a C—C bond having high bonding energy and high thermal stability.

$$R^{101}—S—S-E-S—S—R^{102} \quad (1)$$

In formula (I), E represents a C2-C10 alkylene group, and $R^{101}$ and $R^{102}$ are the same or different and each represent a nitrogen-containing monovalent organic group.

The alkylene group as E is not limited. Examples include linear, branched, and cyclic alkylene groups. Preferred among these are linear alkylene groups.

The number of carbon atoms in the alkylene group as E is 2 to 10, preferably 4 to 8. An alkylene group having one carbon atom has poor thermal stability, and thus the effect of the presence of such an alkylene group tends to be insufficient. An alkylene group having 11 or more carbon atoms tends to make it difficult to form the —S—S-E-S—S— crosslinking chain.

Examples of alkylene groups that may satisfy the above-mentioned conditions include ethylene, trimethylene, tetramethylene, pentamethylene, hexamethylene, heptamethylene, octamethylene, and decamethylene groups. Preferred among these is a hexamethylene group because it allows the smooth formation of the —S—S-E-S—S— crosslinks between the polymer molecules and is also thermally stable.

$R^{101}$ and $R^{102}$ each may be any nitrogen-containing monovalent organic group which preferably contains at least one aromatic ring and more preferably contains a linking group represented by N—C(=S)— wherein the carbon atom is bonded to the dithio group. $R^{101}$ and $R^{102}$ may be the same as or different from each other, preferably the same for reasons such as ease of manufacture.

Examples of the compounds of formula (I) include 1,2-bis(N,N'-dibenzylthiocarbamoyldithio)ethane, 1,3-bis(N,N'-dibenzylthiocarbamoyldithio)propane, 1,4-bis(N,N'-dibenzylthiocarbamoyldithio)butane, 1,5-bis(N,N'-dibenzylthiocarbamoyldithio)pentane, 1,6-bis(N,N'-dibenzylthiocarbamoyldithio)hexane, 1,7-bis(N,N'-dibenzylthiocarbamoyldithio)heptane, 1,8-bis(N,N'-dibenzylthiocarbamoyldithio)octane, 1,9-bis(N,N'-dibenzylthiocarbamoyldithio)nonane, and 1,10-bis(N,N'-dibenzylthiocarbamoyldithio) decane. Among these, 1,6-bis(N,N'-dibenzylthiocarbamoyldithio)hexane is preferred because it is thermally stable and highly polarizable.

The amount of the crosslinking agents capable of forming a bond including an S—C bond between polymer molecules per 100 parts by mass of the rubber component is preferably 0.5 parts by mass or more, more preferably 1.0 part by mass or more. The amount is preferably 8.0 parts by mass or less, more preferably 5.0 parts by mass or less, still more preferably 4.0 parts by mass or less. When the amount is within the range indicated above, good abrasion resistance tends to be obtained. The same range is suitable when the compounds of formula (I) are used as such crosslinking agents. Moreover, the lower or upper limit of the amount of such crosslinking agents or the compounds of formula (I) may be 2.0 parts by mass or 3.0 parts by mass.

Examples of the crosslinking agents capable of causing polymer molecules by themselves to form a C—C bond between them include organic peroxides. Any organic peroxide may be used, including conventional compounds.

Examples of the organic peroxides include acyl peroxides such as benzoyl peroxide, dibenzoyl peroxide, and p-chlorobenzoyl peroxide; peroxyesters such as 1-butyl peroxyacetate, t-butyl peroxybenzoate, and t-butyl peroxyphthalate; ketone peroxides such as methyl ethyl ketone peroxide; alkyl peroxides such as di-t-butyl peroxybenzoate and 1,3-bis(1-butylperoxyisopropyl)benzene; hydroperoxides such as t-butyl hydroperoxide; and dicumyl peroxide and t-butyl cumyl peroxide. From the standpoint of abrasion resistance, dicumyl peroxide or t-butyl cumyl peroxide is preferred among these.

The amount of the crosslinking agents capable of causing polymer molecules by themselves to form a C—C bond between them per 100 parts by mass of the rubber component is preferably 0.1 parts by mass or more, more preferably 0.2 parts by mass or more. The amount is preferably 1.0 part by mass or less, more preferably 0.8 parts by mass or less, still more preferably 0.6 parts by mass or less. When the amount is within the range indicated above, good abrasion resistance tends to be obtained. The same range is suitable when organic peroxides are used as such crosslinking agents. Moreover, the lower or upper limit of the amount of such crosslinking agents or organic peroxides may be 0.4 parts by mass.

Suitable examples of the zinc dithiophosphates include compounds represented by the formula below. The zinc dithiophosphates have a zinc atom at the center of the structure and produce a higher cure accelerating effect than zinc oxide. The use of the zinc dithiophosphates allows for sufficient crosslinking.

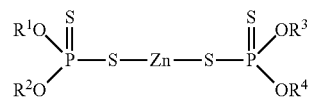

In the formula, $R^1$ to $R^4$ each independently represent a C1-C18 linear or branched alkyl group or a C5-C12 cycloalkyl group.

Examples of the linear or branched alkyl group represented by $R^1$ to $R^4$ include methyl, ethyl, n-propyl, iso-propyl, n-butyl, 4-methylpentyl, 2-ethylhexyl, octyl, and octadecyl groups, while examples of the cycloalkyl group include cyclopentyl, cyclohexyl, and cyclooctyl groups. For easier dispersion in the rubber compositions, $R^1$ to $R^4$ are each preferably a C2-C8 linear or branched alkyl group, more preferably a n-butyl, n-propyl, iso-propyl, or n-octyl group, still more preferably a n-butyl group.

Examples of the zinc dithiophosphates include TP-50, ZBOP-S, and ZBOP-50 all available from Rhein Chemie and compounds similar thereto (for example, compounds of the above formula wherein each of $R^1$ to $R^4$ is a n-butyl group, a n-propyl group, an iso-propyl group, or a n-octyl group).

The amount (amount of active ingredients) of the zinc dithiophosphates per 100 parts by mass of the rubber component is preferably 0.1 parts by mass or more, more preferably 0.5 parts by mass or more, still more preferably 1.0 part by mass or more. The amount is preferably 10.0 parts by mass or less, more preferably 7.0 parts by mass or less, still more preferably 4.0 parts by mass or less. When the amount is within the range indicated above, good abrasion resistance tends to be obtained. The same range is suitable when the compounds of the above formula (zinc dithiophosphates) are used as the zinc dithiophosphates. Moreover, the lower or upper limit of the amount of the zinc dithiophosphates or the compounds of the above formula may be 0.75 parts by mass or 1.5 parts by mass.

The rubber compositions may contain a vulcanization accelerator. In particular, when the crosslinking agent used is sulfur or a crosslinking agent capable of forming a bond including an S—C bond between polymer molecules, the use of a vulcanization accelerator provides good vulcanization properties, thus making it possible to impart excellent abrasion resistance.

Examples of the vulcanization accelerator include thiazole vulcanization accelerators such as 2-mercaptobenzothiazole, di-2-benzothiazolyl disulfide (DM, 2,2'-dibenzothiazolyl disulfide), and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Among these, sulfenamide or thiazole vulcanization accelerators are preferred.

The amount of the vulcanization accelerator per 100 parts by mass of the rubber component is preferably 0.5 parts by mass or more, more preferably 0.7 parts by mass or more. The amount is also preferably 3.0 parts by mass or less, more preferably 2.0 parts by mass or less, still more preferably 1.5 parts by mass or less. When the amount is within the range indicated above, good abrasion resistance tends to be obtained.

The rubber compositions may contain a wax.

Any wax may be used. Examples include petroleum waxes such as paraffin waxes and microcrystalline waxes; naturally-occurring waxes such as plant waxes and animal waxes; and synthetic waxes such as polymers of ethylene, propylene, or other similar monomers. Commercial products available from Ouchi Shinko Chemical Industrial Co., Ltd., Nippon Seiro Co., Ltd., Seiko Chemical Co., Ltd., etc. may be used. These may be used alone or in combinations of two or more. Petroleum waxes are preferred among these, with paraffin waxes being more preferred.

The amount of the wax per 100 parts by mass of the rubber component is preferably 0.5 parts by mass or more, more preferably 1 part by mass or more, but is preferably 10 parts by mass or less, more preferably 6 parts by mass or less.

The rubber compositions preferably contain an antioxidant.

Any antioxidant may be used. Examples include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. Commercial products available from Seiko Chemical Co., Ltd., Sumitomo Chemical Co., Ltd., Ouchi Shinko Chemical Industrial Co., Ltd., Flexsys, etc. may be used. These may be used alone or in combinations of two or more. Preferred among these are p-phenylenediamine antioxidants, more preferably N-(1,3-dimethylbutyl)-N'-phenyl-p-phenylenediamine.

The amount of the antioxidant per 100 parts by mass of the rubber component is preferably 1.0 part by mass or more, more preferably 2.0 parts by mass or more, but is preferably 7.0 parts by mass or less, more preferably 6.0 parts by mass or less.

The rubber compositions preferably contain a fatty acid, in particular, stearic acid.

The stearic acid may be a conventional one, e.g., available from NOF Corporation, Kao Corporation, FUJIFILM Wako Pure Chemical Corporation, or Chiba Fatty Acid Co., Ltd.

The amount of the fatty acid per 100 parts by mass of the rubber component is preferably 0.5 parts by mass or more, more preferably 1.0 part by mass or more. The amount is also preferably 10.0 parts by mass or less.

The rubber compositions preferably contain a fatty acid zinc salt. The fatty acid zinc salt may suitably be a saturated fatty acid zinc salt having a plurality of carbon atoms, i.e., 14 to 20 carbon atoms.

The amount of the fatty acid zinc salt per 100 parts by mass of the rubber component is preferably 1.0 part by mass or more, more preferably 2.0 parts by mass or more. The amount is preferably 6.0 parts by mass or less, more preferably 4.0 parts by mass or less. When the total amount is more than 6.0 parts by mass, abrasion resistance and elongation at break may be reduced. When the amount is within the range indicated above, good abrasion resistance tends to be obtained.

The rubber compositions preferably contain zinc oxide. The zinc oxide may be a conventional one, e.g., available from Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The amount of the zinc oxide per 100 parts by mass of the rubber component is preferably 0.5 parts by mass or more, more preferably 1.0 part by mass or more. The amount is also preferably 5.0 parts by mass or less, more preferably 3.0 parts by mass or less.

In addition to the above-mentioned components, the rubber compositions may contain other additives commonly used in the tire industry, such as processing aids and surfactants.

The tread rubber compositions (vulcanized tread rubber compositions) may be prepared by known methods. For example, they may be prepared by kneading the components using a rubber kneading machine such as an open roll mill, a Banbury mixer, or a kneader, and vulcanizing the kneaded mixture.

The kneading conditions are as follows. The kneading temperature in a base kneading step of kneading additives other than crosslinking agents (vulcanizing agents) and vulcanization accelerators is usually 100 to 180° C., preferably 120 to 170° C. The kneading temperature in a final kneading step of kneading vulcanizing agents and vulcanization accelerators is usually 120° C. or lower, preferably 85 to 110° C. Moreover, the composition obtained after kneading vulcanizing agents and vulcanization accelerators is usually vulcanized by, for example, press vulcanization. The vulcanization temperature is usually 140 to 190° C., preferably 150 to 185° C. When an organic peroxide is used, secondary vulcanization may be conducted as needed. This can remove unnecessary portions or residues of the organic peroxide which have not been involved in the crosslinking, thereby reducing the changes in Hs and Swell before and after heat aging.

The pneumatic tires of the present invention can be produced from the above-described rubber compositions by usual methods. Specifically, an unvulcanized rubber composition containing the above-mentioned components may be extruded into the shape of a tire component such as a tread (a component that contacts a road surface, such as a single-layer tread or a cap tread of a multilayer tread) and assembled with other tire components on a tire building machine in a usual manner to build an unvulcanized tire, which may then be heated and pressurized in a vulcanizer to produce a tire.

The tires may be used as tires for passenger vehicles, large passenger vehicles, large SUVs, heavy duty vehicles such as trucks and buses, light trucks, or motorcycles, or as racing tires (high performance tires) or other tires.

EXAMPLES

The present invention is specifically described with reference to, but not limited to, examples below.

The chemicals used in the examples and comparative examples are listed below.
NR: TSR20
SBR: JSR1502 (styrene content: 23.5% by mass) available from JSR Corporation
BR: BR150B (cis content: 98% by mass) available from Ube Industries, Ltd.
Finely divided carbon black: prototype carbon black ($N_2SA$: 181 m²/g)
Silica: ULTRASIL VN3 ($N_2SA$: 175 m²/g) available from Degussa
Silane coupling agent: Si266 (bis(3-triethoxysilylpropyl) disulfide) available from Evonik Degussa
Oil: Diana Process NH-70S (aromatic process oil) available from Idemitsu Kosan Co., Ltd.
Wax: Ozoace 0355 available from Nippon Seiro Co., Ltd.
Antioxidant 6C: NOCRAC 6C (N-(1,3-dimethylbutyl)-N'-phenyl-p-phenylenediamine) available from Ouchi Shinko Chemical Industrial Co., Ltd.
Antioxidant FR: Antigene FR (purified reaction product of amine and ketone without any residual amine, quinoline antioxidant) available from Sumitomo Chemical Co., Ltd.
Organic resin: STRUKTOL 40MS (ethylene-propylene-styrene copolymer, softening point: 78° C., EP content: 82% by mass) available from STRUKTOL
Fatty acid zinc salt: EF44 available from STRUKTOL
Stearic acid: TSUBAKI available from NOF Corporation
Zinc oxide: zinc oxide available from Mitsui Mining & Smelting Co., Ltd.
Sulfur: HK-200-5 (5% oil-containing sulfur) available from Hosoi Chemical Industry Co., Ltd.
Crosslinking agent 1: Vulcuren VP KA9188 (1,6-bis(N, N'-dibenzylthiocarbamoyldithio)hexane) available from Lanxess
Crosslinking agent 2: dicumyl peroxide
Crosslinking agent 3: TP-50 (mixture of zinc dithiophosphate and polymer, $R^1$ to $R^4$ in the above formula are n-butyl groups, active ingredient: 50% by mass) available from Rhein Chemie
Vulcanization accelerator NS: SANCELER NS-G available from Sanshin Chemical Industry Co., Ltd.

Examples and Comparative Examples

The chemicals other than the sulfur and vulcanization accelerator in the formulation amounts shown in Table 1 to 4 were kneaded at 150° C. for five minutes using a 1.7 L Banbury mixer (Kobe Steel, Ltd.) to give a kneaded mixture. To the kneaded mixture were added the sulfur and vulcanization accelerator, and they were kneaded for five minutes at 80° C. using an open roll mill to give an unvulcanized rubber composition. The unvulcanized rubber composition was press-vulcanized at 170° C. for 20 minutes to obtain a vulcanized rubber composition.

Separately, the unvulcanized rubber composition prepared as above was formed into a tread shape and assembled with other tire components to build an unvulcanized tire. The unvulcanized tire was press-vulcanized at 170° C. for 10 minutes to prepare a test tire (size: 195/65R15).

In Examples 1-4, 2-4, 3-4, and 4-4, the vulcanized rubber compositions and test tires after the press vulcanization were subjected to secondary vulcanization at 120° C. for two hours in an oven or other devices.

<Heat Aging Test>

The new (before heat aging) vulcanized rubber compositions were subjected to heat aging (100° C., 96 hours) in accordance with JIS K6257:2010 to prepare heat-aged vulcanized rubber compositions.

The test tires and the new and heat-aged vulcanized rubber compositions were evaluated as described below. Tables 1 to 4 show the results. It should be noted that Comparative Examples 1-1, 2-1, 3-1, and 4-1 are used as standards of comparison in Tables 1, 2, 3, and 4, respectively.

(Hardness (Hs) of Rubber)

The Hs (hardness) of specimens of the new (before heat aging) and heat-aged vulcanized rubber sheets (vulcanized rubber compositions) was measured in accordance with JIS K6253 "Rubber, vulcanized or thermoplastic-Determination of hardness" using a type A durometer (measurement temperature: 23° C.±2° C.).

(Degree of Crosslinking (Swell))

Specimens (20 mm×20 mm×2 mm) of the vulcanized rubber sheets (vulcanized rubber compositions) before and after heat aging were immersed in toluene at 25° C. for 24 hours. The volume changes (Swell (%)) of the specimens before and after the immersion were measured.

(Abrasion Resistance)

The test tires of each example were mounted on a front-engine, front-wheel-drive car made in Japan. After running 8000 km, the groove depth in the tire tread portion was measured. A distance that caused a 1 mm decrease in tire groove depth was calculated and expressed as an index (abrasion resistance index), with the standard comparative example set equal to 100. A higher index means that the distance that caused a 1 mm decrease in tire groove depth is longer, and thus abrasion resistance is better.

TABLE 1

|  |  |  | Comparative Example | Example | | | | | |
|---|---|---|---|---|---|---|---|---|---|
|  |  |  | 1-1 | 1-1 | 1-2 | 1-3 | 1-4 | 1-5 | 1-6 |
| Formulation (parts by mass) | NR |  | 60 | 60 | 60 | 60 | 60 | 60 | 60 |
|  | SBR |  | 20 | 20 | 20 | 20 | 20 | 20 | 20 |
|  | BR |  | 20 | 20 | 20 | 20 | 20 | 20 | 20 |
|  | Finely divided carbon black |  | 45 | 45 | 45 | 45 | 45 | 45 | 45 |
|  | Silica |  | 20 | 20 | 20 | 20 | 20 | 20 | 20 |
|  | Silane coupling agent |  | 1.6 | 1.6 | 1.6 | 1.6 | 1.6 | 1.6 | 1.6 |
|  | Oil |  | 5 | 5 | 5 | 5 | 5 | 5 | 5 |
|  | Wax |  | 1.5 | 1.5 | 1.5 | 1.5 | 1.5 | 1.5 | 1.5 |
|  | Antioxidant 6C |  | 2 | 2 | 2 | 2 | 2 | 2 | 2 |
|  | Antioxidant FR |  | 1 | 1 | 1 | 1 | 1 | 1 | 1 |
|  | Organic resin |  | 2 | 2 | 2 | 2 | 2 | 2 | 2 |
|  | Fatty acid zinc salt |  | 3 | 3 | 3 | 3 | 3 | 3 | 3 |
|  | Stearic acid |  | 2 | 2 | 2 | 2 | 2 | 2 | 2 |
|  | Zinc oxide |  | 2.5 | 2.5 | 2.5 | 2.5 | 2.5 | 2.5 | 2.5 |
|  | Sulfur |  | 1.5 | 0.5 | 0.5 | 0.5 | — | 0.5 | 0.5 |
|  | Crosslinking agent 1 |  | — | 1 | 2 | 3 | — | — | 1.5 |
|  | Crosslinking agent 2 |  | — | — | — | — | 0.4 | — | — |
|  | Crosslinking agent 3 |  | — | — | — | — | — | 3 | 1.5 |
|  | Vulcanization accelerator NS |  | 1 | 1 | 1 | 1 | — | 1 | 1 |
| Evaluation | Hs | Before heat aging | 65.0 | 64.0 | 67.0 | 68.5 | 65.0 | 64.5 | 66.5 |
|  |  | After heat aging | 71.0 | 66.5 | 69.0 | 71.0 | 65.5 | 67.5 | 69.0 |
|  | \| ΔHs \| | \| Hs after heat aging − Hs before heat aging \| | 6.0 | 2.5 | 2.0 | 2.5 | 0.5 | 3.0 | 2.5 |
|  | Swell | Before heat aging | 333 | 341 | 302 | 283 | 341 | 339 | 310 |
|  |  | After heat aging | 283 | 322 | 288 | 268 | 336 | 319 | 292 |
|  | \| ΔSwell \| | \| Swell after heat aging − Swell before heat aging \| | 50 | 19 | 14 | 15 | 5 | 20 | 18 |
|  | Abrasion resistance |  | 100 | 124 | 112 | 105 | 103 | 124 | 113 |

TABLE 2

|  |  |  | Comparative Example | Example | | | |
|---|---|---|---|---|---|---|---|
|  |  |  | 2-1 | 2-1 | 2-2 | 2-3 | 2-4 |
| Formulation (parts by mass) | NR |  | 50 | 50 | 50 | 50 | 50 |
|  | SBR |  | 25 | 25 | 25 | 25 | 25 |
|  | BR |  | 25 | 25 | 25 | 25 | 25 |
|  | Finely divided carbon black |  | 45 | 45 | 45 | 45 | 45 |
|  | Silica |  | 20 | 20 | 20 | 20 | 20 |
|  | Silane coupling agent |  | 1.6 | 1.6 | 1.6 | 1.6 | 1.6 |
|  | Oil |  | 5 | 5 | 5 | 5 | 5 |
|  | Wax |  | 1.5 | 1.5 | 1.5 | 1.5 | 1.5 |
|  | Antioxidant 6C |  | 2 | 2 | 2 | 2 | 2 |
|  | Antioxidant FR |  | 1 | 1 | 1 | 1 | 1 |
|  | Organic resin |  | 2 | 2 | 2 | 2 | 2 |
|  | Fatty acid zinc salt |  | 3 | 3 | 3 | 3 | 3 |
|  | Stearic acid |  | 2 | 2 | 2 | 2 | 2 |
|  | Zinc oxide |  | 2.5 | 2.5 | 2.5 | 2.5 | 2.5 |
|  | Sulfur |  | 1.5 | 0.5 | 0.5 | 0.5 | — |
|  | Crosslinking agent 1 |  | — | 1 | 2 | 3 | — |
|  | Crosslinking agent 2 |  | — | — | — | — | 0.4 |
|  | Vulcanization accelerator NS |  | 1 | 1 | 1 | 1 | — |
| Evaluation | Hs | Before heat aging | 64.0 | 64.0 | 66.0 | 68.0 | 64.0 |
|  |  | After heat aging | 69.0 | 66.0 | 67.5 | 70.0 | 64.5 |
|  | \| ΔHs \| | \| Hs after heat aging − Hs before heat aging \| | 5.0 | 2.0 | 1.5 | 2.0 | 0.5 |

TABLE 2-continued

|  |  |  | Comparative Example | Example | | | |
|---|---|---|---|---|---|---|---|
|  |  |  | 2-1 | 2-1 | 2-2 | 2-3 | 2-4 |
|  | Swell | Before heat aging | 326 | 335 | 292 | 286 | 331 |
|  |  | After heat aging | 281 | 320 | 279 | 271 | 327 |
|  | \| Δ Swell \| | \| Swell after heat aging − Swell before heat aging \| | 45 | 15 | 13 | 15 | 4 |
|  | Abrasion resistance |  | 100 | 131 | 117 | 106 | 104 |

TABLE 3

|  |  |  | Comparative Example | Example | | | |
|---|---|---|---|---|---|---|---|
|  |  |  | 3-1 | 3-1 | 3-2 | 3-3 | 3-4 |
| Formulation (parts by mass) | NR |  | 60 | 60 | 60 | 60 | 60 |
|  | SBR |  | 20 | 20 | 20 | 20 | 20 |
|  | BR |  | 20 | 20 | 20 | 20 | 20 |
|  | Finely divided carbon black |  | 60 | 60 | 60 | 60 | 60 |
|  | Silica |  | 20 | 20 | 20 | 20 | 20 |
|  | Silane coupling agent |  | 1.6 | 1.6 | 1.6 | 1.6 | 1.6 |
|  | Oil |  | 5 | 5 | 5 | 5 | 5 |
|  | Wax |  | 1.5 | 1.5 | 1.5 | 1.5 | 1.5 |
|  | Antioxidant 6C |  | 2 | 2 | 2 | 2 | 2 |
|  | Antioxidant FR |  | 1 | 1 | 1 | 1 | 1 |
|  | Organic resin |  | 2 | 2 | 2 | 2 | 2 |
|  | Fatty acid zinc salt |  | 3 | 3 | 3 | 3 | 3 |
|  | Stearic acid |  | 2 | 2 | 2 | 2 | 2 |
|  | Zinc oxide |  | 2.5 | 2.5 | 2.5 | 2.5 | 2.5 |
|  | Sulfur |  | 1.5 | 0.5 | 0.5 | 0.5 | — |
|  | Crosslinking agent 1 |  | — | 1 | 2 | 3 | — |
|  | Crosslinking agent 2 |  | — | — | — | — | 0.4 |
|  | Vulcanization accelerator NS |  | 1 | 1 | 1 | 1 | — |
| Evaluation | Hs | Before heat aging | 70.0 | 69.0 | 72.0 | 74.0 | 69.0 |
|  |  | After heat aging | 76.0 | 72.0 | 74.0 | 76.0 | 69.5 |
|  | \| ΔHs \| | \| Hs after heat aging − Hs before heat aging \| | 6.0 | 3.0 | 2.0 | 2.0 | 0.5 |
|  | Swell | Before heat aging | 312 | 322 | 280 | 271 | 316 |
|  |  | After heat aging | 270 | 302 | 269 | 257 | 311 |
|  | \| ΔSwell \| | \| Swell after heat aging − Swell before heat aging \| | 42 | 20 | 11 | 14 | 5 |
|  | Abrasion resistance |  | 100 | 124 | 118 | 104 | 105 |

TABLE 4

|  |  |  | Comparative Example | Example | | | |
|---|---|---|---|---|---|---|---|
|  |  |  | 4-1 | 4-1 | 4-2 | 4-3 | 4-4 |
| Formulation (parts by mass) | NR |  | 60 | 60 | 60 | 60 | 60 |
|  | SBR |  | 20 | 20 | 20 | 20 | 20 |
|  | BR |  | 20 | 20 | 20 | 20 | 20 |
|  | Finely divided carbon black |  | 45 | 45 | 45 | 45 | 45 |
|  | Silica |  | 40 | 40 | 40 | 40 | 40 |
|  | Silane coupling agent |  | 1.6 | 1.6 | 1.6 | 1.6 | 1.6 |
|  | Oil |  | 5 | 5 | 5 | 5 | 5 |
|  | Wax |  | 1.5 | 1.5 | 1.5 | 1.5 | 1.5 |
|  | Antioxidant 6C |  | 2 | 2 | 2 | 2 | 2 |
|  | Antioxidant FR |  | 1 | 1 | 1 | 1 | 1 |
|  | Organic resin |  | 2 | 2 | 2 | 2 | 2 |
|  | Fatty acid zinc salt |  | 3 | 3 | 3 | 3 | 3 |
|  | Stearic acid |  | 2 | 2 | 2 | 2 | 2 |
|  | Zinc oxide |  | 2.5 | 2.5 | 2.5 | 2.5 | 2.5 |
|  | Sulfur |  | 1.5 | 0.5 | 0.5 | 0.5 | — |
|  | Crosslinking agent 1 |  | — | 1 | 2 | 3 | — |
|  | Crosslinking agent 2 |  | — | — | — | — | 0.4 |
|  | Vulcanization accelerator NS |  | 1 | 1 | 1 | 1 | — |
| Evaluation | Hs | Before heat aging | 69.0 | 69.0 | 71.0 | 72.0 | 68.0 |
|  |  | After heat aging | 75.0 | 72.0 | 73.0 | 74.0 | 70.0 |
|  | \| ΔHs \| | \| Hs after heat aging − Hs before heat aging \| | 6.0 | 3.0 | 2.0 | 2.0 | 2.0 |

TABLE 4-continued

|  |  | Comparative Example | Example | | | |
|---|---|---|---|---|---|---|
|  |  | 4-1 | 4-1 | 4-2 | 4-3 | 4-4 |
| Swell | Before heat aging | 311 | 312 | 280 | 262 | 304 |
|  | After heat aging | 259 | 292 | 264 | 245 | 296 |
| \|ΔSwell\| | \|Swell after heat aging − Swell before heat aging\| | 52 | 20 | 16 | 17 | 8 |
| Abrasion resistance |  | 100 | 121 | 112 | 103 | 102 |

Tables 1 to 4 show that excellent abrasion resistance was exhibited in the examples containing 10% by mass or more of SBR and 10% by mass or more of BR and also satisfying relationships (1) and (2).

The invention claimed is:

1. A pneumatic tire comprising a tread rubber composition,
comprising, based on 100% by mass of a rubber component therein, 10% by mass or more of styrene-butadiene rubber, 10% by mass or more of polybutadiene rubber and 25% by mass or more of isoprene-based rubber, and
having an absolute value of change in hardness before and after heat aging, |ΔHs|, satisfying the following relationship (1) and an absolute value of change in Swell before and after heat aging, |ΔSwell|, satisfying the following relationship (2):

$$|\Delta Hs| \leq 3.0 \quad (1);$$

$$|\Delta Swell| \leq 20\% \quad (2),$$

wherein the heat aging is performed in accordance with JIS K6257:2010 under heat aging conditions at 100° C. over 96 hours, and the hardness (Hs) of the rubber composition is measured using a type A durometer in accordance with JIS K6253.

2. A pneumatic tire comprising a tread rubber composition,
comprising, based on 100% by mass of a rubber component therein, 10% to 60% by mass or more of styrene-butadiene rubber and 10% by mass or more of polybutadiene rubber, and
having an absolute value of change in hardness before and after heat aging, |ΔHs|, satisfying the following relationship (1) and an absolute value of change in Swell before and after heat aging, |ΔSwell|, satisfying the following relationship (2):

$$|\Delta Hs| \leq 3.0 \quad (1);$$

$$|\Delta Swell| \leq 20\% \quad (2),$$

wherein the heat aging is performed in accordance with JIS K6257:2010 under heat aging conditions at 100° C. over 96 hours, and the hardness (Hs) of the rubber composition is measured using a type A durometer in accordance with JIS K6253.

3. A pneumatic tire comprising a tread rubber composition,
comprising, based on 100% by mass of a rubber component therein, 10% by mass or more of styrene-butadiene rubber, 10% by mass or more of polybutadiene rubber, and silica, and
having an absolute value of change in hardness before and after heat aging, |ΔHs|, satisfying the following relationship (1) and an absolute value of change in Swell before and after heat aging, |ΔSwell|, satisfying the following relationship (2):

$$|\Delta Hs| \leq 3.0 \quad (1);$$

$$|\Delta Swell| \leq 20\% \quad (2),$$

wherein the amount of silica per 100 parts by mass of the rubber component is 5 to 40 parts by mass,
wherein the heat aging is performed in accordance with JIS K6257:2010 under heat aging conditions at 100° C. over 96 hours, and the hardness (Hs) of the rubber composition is measured using a type A durometer in accordance with JIS K6253.

4. The pneumatic tire according to claim 1,
wherein the |ΔHs| and the |ΔSwell| satisfies the following relationships:

$$|\Delta Hs| \leq 2.5;$$

$$|\Delta Swell| \leq 19\%.$$

5. The pneumatic tire according to claim 1,
wherein the |ΔHs| and the |ΔSwell| satisfies the following relationships:

$$|\Delta Hs| \leq 2.0,$$

$$|\Delta Swell| \leq 15\%.$$

6. The pneumatic tire according to claim 1,
wherein the |ΔHs| and the |ΔSwell| satisfies the following relationships:

$$|\Delta Hs| \leq 1.5$$

$$|\Delta Swell| \leq 10\%.$$

7. The pneumatic tire according to claim 1,
wherein the |ΔHs| and the |ΔSwell| satisfies the following relationships:

$$|\Delta Hs| \leq 1.0$$

$$|\Delta Swell| \leq 5\%.$$

8. The pneumatic tire according to claim 1,
wherein the |ΔHs| and the |ΔSwell| satisfies the following relationships:

$$|\Delta Hs| \leq 0.5.$$

$$|\Delta Swell| \leq 4\%.$$

9. The pneumatic tire according to claim 1,
wherein the rubber composition comprises sulfur and a crosslinking agent other than sulfur.

10. The pneumatic tire according to claim 1,
wherein the rubber composition comprises a crosslinking agent other than sulfur alone as a crosslinking agent.

11. The pneumatic tire according to claim 2, wherein the rubber composition comprises 25% by mass or more of an isoprene-based rubber based on 100% by mass of the rubber component.

* * * * *